United States Patent Office 3,173,910
Patented Mar. 16, 1965

3,173,910
N-AMINOETHYLENIMINE AND ITS
PRODUCTION
Allen F. Graefe, Monrovia, Calif., assignor to Aerojet-General Corporation, Azusa, Calif., a corporation of Ohio
No Drawing. Filed July 29, 1953, Ser. No. 371,187
9 Claims. (Cl. 260—239)

This invention relates to a new composition of matter, N-aminoethylenimine, and its preparation. This compound finds valuable use as a propellant and as a rocket fuel in bi-propellant rocket systems.

Certain fuels have been found to be capable of high thrust and therefore find use as propellant fuels. Among these fuels are hydrazine, ammonia, and liquid hydrogen. Each of these fuels, while capable of producing the desired high thrust, nevertheless, possesses certain undesirable physical properties which severely impair their use for this purpose. Hydrazine is limited in its use because of its high freezing point; ammonia posseses an undesirable excessive vapor pressure, and liquid hydrogen must be handled as a condensed gas under refrigeration.

The new composition of matter described herein, N-aminoethylenimine, however, not only exhibits a high theoretical specific impulse when burned with liquid oxygen but also freezes below —50° C. and has a vapor pressure of less than one atmosphere below temperatures of 100° C.

The unique structure of this compound, combining the features of a strained three membered ring as well as a hydrazine function causes the material to be a highly reactive fuel giving it valuable properties for use as one of the constituents of a bi-propellant rocket system.

N-aminoethylenimine can be easily prepared by the dehydration of ethanol hydrazine. Ethanol hydrazine is readily prepared in the conventional manner through the action of ethylene oxide upon hydrazine. The preparation of N-aminoethylenimine proceeds according to the reaction scheme set forth below; wherein MOH is a strong base

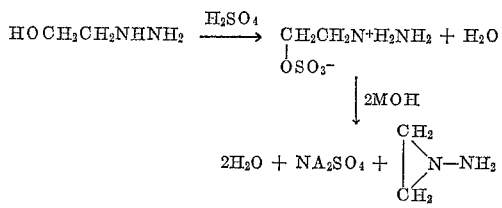

The sulfuric acid ester of ethanol hydrazine is obtained by the action of aqueous sulfuric acid, or sulfonic acid adducts upon aqueous ethanol hydrazine under reduced pressure. The temperature of this reaction is preferably kept within the range of from about 100° C. to 120° C., since at lower temperatures side reactions take place forming ethanol hydrazinium sulfate or bis-hydrazino-ethyl ether, while at higher temperatures oxidation of the hydrazine function is likely to occur. The ester is decomposed through the action of a solution of a strong base and the N-aminoethylenimine salted out from the distillate with solid basic material.

Alternatively N-aminoethylenimine can be prepared directly by the high temperature, vapor phase, dehydration of ethanol hydrazine in a tube packed with activated alumina. Ethanol hydrazine is vaporized through a tube containing alumina pellets or powder mixed with glass beads. The temperature of the bed should be maintained at from about 300° C. to 450° C. The product is frozen out from the stream in traps cooled to about —80° C. The concentration of the ethanol hydrazine is kept low in the heated zone by the introduction of a stream of nitrogen gas into the boiling material. The dwell time of the system can be conveniently varied by controlling the pressure on the downstream side of the reactor.

N-aminoethylenimine may also be prepared by the reduction of N-nitrosoethylenimine, and also by the reaction of chloramine, $NH_2Cl$, upon lithium ethylenimine, $C_2H_4NLi$.

The following example is provided to more clearly define the invention:

*Example I*

Twenty-five grams of ethanolhydrazine and 34 g. of 95% sulfuric acid were separately diluted with half their weight of water, and cooled in an ice bath. The hydrazine was then added dropwise with stirring to the aqueous acid at such a rate that the temperature did not rise above 20° C. The resulting solution was clear and colorless. The water was removed by distillation at 100° C. and 5 mm. The yellow glassy reaction mixture crystallized only partially on cooling. A portion of this crystallized material was purified by recrystallization from an ethanol-water mixture, M.P. 123–4° C.

The above material was decomposed to give N-aminoethylenimine as follows: Sixteen grams was dissolved in a cold solution of 8 g. of sodium hydroxide in 60 ml. of water. The cold solution was added dropwise to 100 ml. of a 14 percent boiling sodium hydroxide solution. A flash distillation technique was used. The 14 percent sodium hydroxide solution was placed in a three liter, three-necked, round bottomed flask fitted with a dropping funnel, a mechanical stirrer, and a condenser set for downward distillation. The receiver was fitted with a second (upright) condenser for adequate cooling, and was placed in an ice-salt bath. The cold ester solution was added to the well stirred boiling solution of 14 percent sodium hydroxide at a rate such that the volume of liquid in the boiler remained nearly constant. Solid sodium hydroxide (40 g.) was added to the distillate, and the temperature was kept below about 30° C. during this operation. A yellow oil separated out, which gradually turned orange-brown. The yield of crude oil was about 35 percent of the theoretical amount. The oil was separated and dried over sodium hydroxide pellets. Distillation through an efficient column gave a colorless fraction of N-aminoethylenimine having the following physical properties:

Boiling point _____ 82.0° C.
Melting point _____ —59° C.
Specific gravity _____ 22° C., 0.906.
Viscosity _____ 0.973 centistoke at 20° C.
Vapor pressure _____ (40° to 82° C.) $\log_{10} P_{mm.}$
  $= -2404.2/T + 9.643$.
Heat of combustion _____ —453.9 kcal./mole.
Heat of formation _____ 60.9 kcal./mole.

The calculated heat of combustion of N-aminoethylenimine is —444.9 kcal./mole, a value differing from that observed by only about 0.5 percent.

N-aminoethylenimine as described above has valuable use as the fuel constituent of a bi-propellant rocket system and may be used conveniently with any strong liquid oxidizing agent such as liquid oxygen or nitric acid.

In the preparation of alkylenimines sulfonic acid adducts may be used interchangeably with sulfuric acid. Similarly, any strong base such as potassium hydroxide, lithium hydroxide, magnesium hydroxide, calcium hydroxide, etc., may be used in place of sodium hydroxide.

N-aminopropylenimine and homologous having longer carbon chains imines can be prepared in accordance with the procedures outlined above by the selection of suitable starting materials. These compositions, however, are not suitable as propellants or propellant fuels due to the proportionate decrease in ring strain and hydrazine hydrocarbon proportions, accompanied by a corresponding decrease in explosive and propellant properties.

I claim:

1. A new composition of matter, N-aminoethylenimine, having the structural formula:

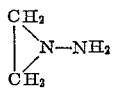

2. A process for preparing N-aminoethylenimine which comprises heating the sulfuric acid ester of ethanol hydrazine in the presence of sodium hydroxide.

3. The method of preparing unsubstituted N-amino lower alkylenimines which comprises reacting a lower alkanolhydrazine with sulfuric acid, and subsequently reacting the resultant ester with a base selected from the group consisting of the alkali and alkaline earth metal hydroxides.

4. The method of claim 3 wherein sulfuric acid is generated in situ.

5. The method of preparing N-aminoethylenimine which comprises reacting ethanolhydrazine with sulfuric acid to form a sulfuric acid ester and subsequently reacting said ester with a base selected from the group consisting of the alkali and alkaline earth metal hydroxides.

6. The method of claim 5 wherein sulfuric acid is generated in situ.

7. The method of claim 3 wherein the temperature during the esterification reaction is maintained in the range of from about 100 to 120° C.

8. The method of preparing N-aminoethylenimine which comprises reacting ethanolhydrazine with sulfuric acid to form a sulfuric acid ester, reacting said ester with a strong base selected from the group consisting of alkali and alkaline earth metal hydroxides; and separating the N-aminoethylenimine by salting out with solid sodium hydroxide.

9. The method of preparing N-amino, lower alkyl-enimines which comprises reacting hydrazinoalkylene sulfuric acid with a boiling strong base selected from the group consisting of the alkali and alkaline earth metal hydroxides to effect ring closure.

References Cited in the file of this patent

Elderfield: "Heterocyclic Compounds," vol. 1, page 666 (1950), John Wiley & Sons, Inc.